Jan. 26, 1926.
J. O. STEWART
1,570,713
EMERGENCY GRIP FOR VEHICLE WHEELS
Filed March 30, 1925
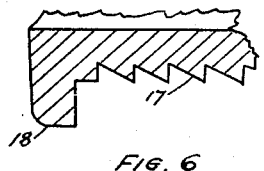
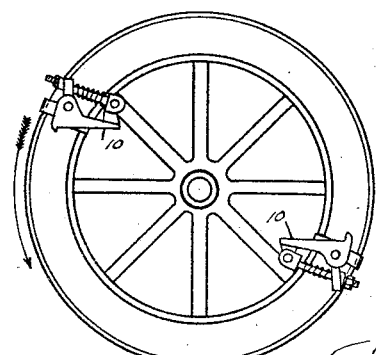
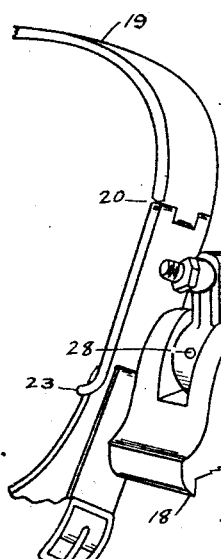
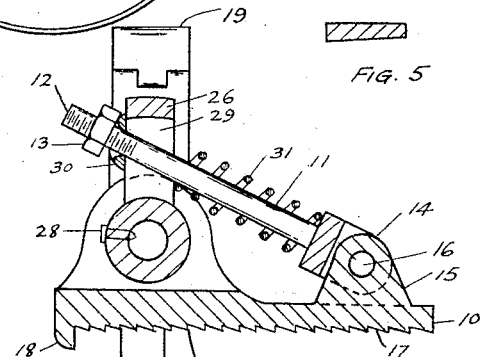
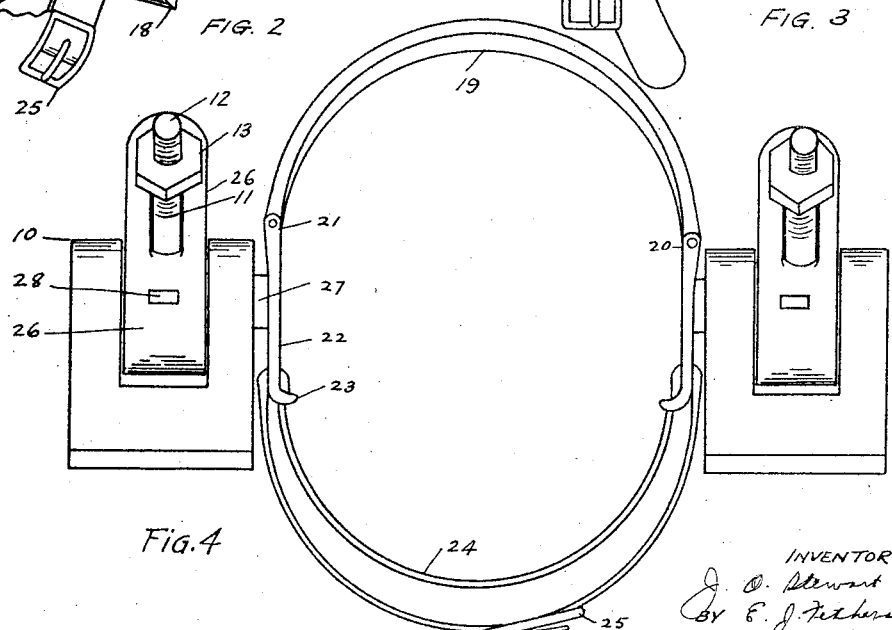
INVENTOR
J. O. Stewart
BY E. J. Featherstonhaugh
ATTORNEY.

Patented Jan. 26, 1926.

1,570,713

UNITED STATES PATENT OFFICE.

JAMES OLIVER STEWART, OF GORRIE, ONTARIO, CANADA.

EMERGENCY GRIP FOR VEHICLE WHEELS.

Application filed March 30, 1925. Serial No. 19,207.

*To all whom it may concern:*

Be it known that I, JAMES OLIVER STEWART, a subject of the King of Great Britain, residing at the village of Gorrie, in the county of Huron, in the Province of Ontario, and Dominion of Canada, have invented new and useful Emergency Grips for Vehicle Wheels, of which the following is a specification.

This invention relates to improvements in emergency grips for vehicle wheels as described in the present specification and illustrated in the accompanying drawings that form part of the same.

The invention consists essentially of the novel features pointed out broadly and specifically in the claims for novelty following a description containing an explanation in detail of an acceptable form of the invention.

The objects of the invention are to provide durable and inexpensive emergency grips for vehicle wheels, of simple, reliable, strong and relatively light construction, capable of being easily mounted upon the wheel with a minimum of effort and within a minimum of time; to minimize loss of time, trouble and hardship occasioned by an auto or truck becoming entangled in soft earth, mud or snow; to provide grips, the construction of which will not in any way cause injury to tire, rim or spokes; and generally to furnish the public with an economical commodity which will meet all the standard tests required of such articles and accomplish the aforesaid purposes.

In the drawings, Figure 1 is a side view of an auto or truck wheel showing two emergency grips secured thereto.

Figure 2 is a perspective view of a half part of the device, there being two complete shoes thereto.

Figure 3 is a cross section through one of the shoes.

Figure 4 is a front view of the device.

Figure 5 is a cross section at the top of the stirrup, showing the beveled section thereof.

Figure 6 is a section of the shoe, showing how the teeth are made.

Like numerals of reference indicate corresponding parts in the various figures.

Referring to the drawings, 10 is one of the shoes, made of some suitable material, the shoe having cross teeth 17 and a pick 18 at the end. 11 is a clamping bolt having one end 12 threaded to take a standard nut 13 and a jaw 14 at the other end engaging a lug 15, the whole being free to move in an arc of a circle around the spindle 16.

19 is the upper part of a steel portion of the band mounting for the shoes, tapered so as to bind the wheel when the device is put to use and prevent the tire or rim from being cut. 20 and 21 are pivot pins securing the links 22 to the steel section 19, the pin 21 being removable and both links having the slots 23 at their inturned ends to receive the leather strap 24 with buckle 25. 26 is a clamping loop adapted to engage the clamping bolt 11 and being secured to a shaft 27 by means of a pin 28, or some suitable key, the shaft 27 and the loop 26 forming a rigid part with a link 22 of the band. 30 is a washer with a spherical surface. 31 is a spring, bearing at one end upon the loop 26 and at the other upon the back of the jaw 14.

In operation, the band is placed around the wheel rim and tire, with the steel section either next to the tire or to the rim, and for that purpose the pin 28 or any other suitable key can be placed in two positions, 180 degrees from one another. The device is then moved up or down the wheel until it is set in such a position as will allow the bearing surface of the shoe to meet the surface of the ground in complete contact when the wheel is rotated. The strap is then tightened and the auto or truck set in motion.

If the device is not set in its ideal position, thus causing the end opposite to the pick to first come into contact with the ground, the spring 31 will give and the shoe will slightly rotate around shaft 27. If also, during the motion of the wheel, earth or snow of uneven hardness causes the shoes to rotate slightly around shaft 27, the spring will again yield. If, on the other hand, the other end of the shoe, that is, the pick end, first touches the ground, the pick will dig into the ground and cause enough resistance to force the auto or truck forward.

What I claim is:

1. In emergency grips for vehicle wheels, a band forming a shoe mounting and adapted to be secured around the rim and tire of the vehicle wheel, a shaft extending from said band, a shoe having a gripping surface and rotatably mounted on said shaft and a resilient clamping mechanism limiting the rotation of said shoe on said shaft.

2. In emergency grips for vehicle wheels, a shoe mounting adapted to be secured to the vehicle wheel rim, a shoe on either side of said mounting and having pick ends adapted to dig into the surface engaged, and resilient clamping mechanism limiting the rotation of said shoes on their mounting.

3. An emergency grip for a vehicle wheel comprising two shoes, two clamping loops, a shoe mounting mechanism fixed to said clamping loops, a clamping bolt of adjustable effective length and a helical spring encircling said clamping bolt.

4. An emergency grip for a vehicle wheel comprising two shoes, each shoe having a bearing surface indented with a series of cross teeth and a pick at one end thereof, two lugs forming bearings for a shaft and a lug engaging a clamping bolt; two clamping loops, a shoe mounting mechanism fixed to said clamping loops, a clamping bolt of adjustable effective length and a helical spring encircling said clamping bolt.

5. An emergency grip for a vehicle wheel comprising two shoes, each shoe having a bearing surface indented with a series of cross teeth, running the full width of said shoe, said teeth being shaped in the form of right angle triangles and disposed throughout the whole length of the bottom flat surface of said shoe, and a pick at one end thereof running the full width of said shoe; two clamping loops, a shoe mounting mechanism fixed to said clamping loops, a clamping bolt of adjustable effective length and a helical spring encircling said clamping bolt.

6. An emergency grip for a vehicle wheel comprising two shoes, each shoe having a bearing surface indented with a series of cross teeth and a pick at one end thereof, two lugs forming bearings for a shaft and a lug located at one end in the longitudinal axis of said shoe and engaging a clamping bolt; two clamping loops, a shoe mounting mechanism fixed to said clamping loops, a clamping bolt of adjustable effective length with a helical spring encircling said clamping bolt.

7. An emergency grip for a vehicle wheel comprising two shoes, two clamping loops, each pivoting on a shaft and having its lever end slotted, holes or keyways disposed at 180 degrees one from the other in the bearing surface, said clamping loops being rigidly connected to a shoe mounting mechanism; said shoe mounting mechanism fixed to said clamping loops, a clamping bolt of adjustable effective length and a helical spring encircling said clamping bolt.

8. An emergency grip for a vehicle wheel comprising two shoes, two clamping loops, a shoe mounting mechanism comprising a three-piece steel stirrup made of two side steel links fixed rigidly to said clamping loops, and an upper portion hinged to one side link and locked to the other side link, and having the inturned bottom ends slotted, and a strap with buckle passing therethrough; a clamping bolt of adjustable effective length and a helical spring encircling said clamping bolt.

9. An emergency grip for a vehicle wheel comprising two shoes, two clamping loops, a shoe mounting mechanism comprising a two-piece steel stirrup, each being rigidly fixed to said clamping loops, and being designed to lock one into the other at the top, and having the inturned bottom ends slotted, and a strap with buckle passing therethrough; a clamping bolt of adjustable effective length with a helical spring encircling said clamping bolt.

10. An emergency grip for a vehicle wheel, comprising two shoes, two clamping loops, a shoe mounting mechanism fixed to said clamping loops, a clamping bolt pivoted about a lug in said shoe and comprising a jaw at one end and threaded portion at the other, a nut, a washer having a spherical surface and a helical spring encircling said clamping bolt.

Signed at Gorrie, Canada, this fourteenth day of March, 1925.

JAMES OLIVER STEWART.